United States Patent
Zhang et al.

(10) Patent No.: US 8,869,542 B2
(45) Date of Patent: Oct. 28, 2014

(54) POLYMER-BASED ELECTROCALORIC COOLING DEVICES

(75) Inventors: Qiming Zhang, State College, PA (US); Sheng-Guo Lu, State College, PA (US); Xinyu Li, State College, PA (US); Lee Gorny, State College, PA (US); Jiping Cheng, State College, PA (US); Bret P. Neese, Somerset, NJ (US); Baojin Chu, Rapid City, SD (US)

(73) Assignee: The Penn State Research Foundation, University Park, PA (US)

( * ) Notice: Subject to any disclaimer, the term of this patent is extended or adjusted under 35 U.S.C. 154(b) by 1004 days.

(21) Appl. No.: 12/844,335

(22) Filed: Jul. 27, 2010

(65) Prior Publication Data

US 2011/0016885 A1    Jan. 27, 2011

Related U.S. Application Data

(60) Provisional application No. 61/228,885, filed on Jul. 27, 2009, provisional application No. 61/354,967, filed on Jun. 15, 2010.

(51) Int. Cl.
*F25B 21/00*    (2006.01)
*F25B 21/02*    (2006.01)
*F28D 15/00*    (2006.01)

(52) U.S. Cl.
CPC .......... *F25B 21/00* (2013.01); *Y02B 30/66* (2013.01); *F25B 2321/001* (2013.01)
USPC .............. 62/3.1; 62/3.3; 62/3.7; 165/104.23

(58) Field of Classification Search
CPC .......... F25B 21/00; F25B 21/02; F25B 21/04; F25B 2321/021; F25B 2321/001; F25B 2321/025; F25B 2321/0251; F25B 2321/0252; H01F 1/012; H01F 1/017
USPC ................ 62/3.1, 3.3, 3.7; 165/104.23
See application file for complete search history.

(56) References Cited

U.S. PATENT DOCUMENTS

| | | | | |
|---|---|---|---|---|
| 2,636,851 | A  * | 4/1953 | McRae et al. | 205/517 |
| 6,183,855 | B1 * | 2/2001 | Buckley | 165/104.23 |
| 6,250,087 | B1 * | 6/2001 | Owada et al. | 62/3.1 |
| 6,272,866 | B1 * | 8/2001 | Tsai et al. | 62/3.1 |
| 6,530,231 | B1 * | 3/2003 | Nagy et al. | 62/3.2 |
| 6,595,006 | B2 * | 7/2003 | Thiesen et al. | 62/3.1 |
| 6,644,395 | B1   | 11/2003 | Bergin | |
| 6,662,571 | B1 * | 12/2003 | Nagy et al. | 62/3.2 |
| 6,725,668 | B1 * | 4/2004 | Cornwall | 62/3.1 |
| 6,787,238 | B2   | 9/2004 | Zhang et al. | |

(Continued)

OTHER PUBLICATIONS

Zhang, Q. M. et al., "Giang Electrostriction and Relaxor Ferroelectric Behavior in Electron-Irradiated Poly(vinylidene fluoride-trifluoroethylene) Copolymer", Science, Jun. 26, 1998, pp. 2101-02104, vol. 280, www.sciencemag.org.

(Continued)

*Primary Examiner* — Ljiljana Ciric
(74) *Attorney, Agent, or Firm* — McDermott Will & Emery LLP

(57) ABSTRACT

Cooling devices (i.e., refrigerators or heat pumps) based on polymers which exhibit a temperature change upon application or removal of an electrical field or voltage, (e.g., fluoropolymers or crosslinked fluoropolymers that exhibit electrocaloric effect).

6 Claims, 7 Drawing Sheets

(56) References Cited

U.S. PATENT DOCUMENTS

| | | | |
|---|---|---|---|
| 7,085,483 B2* | 8/2006 | Terashima et al. | 165/104.23 |
| 7,260,939 B2* | 8/2007 | Weaver, Jr. | 62/3.1 |
| 7,305,839 B2* | 12/2007 | Weaver, Jr. | 62/3.1 |
| 7,750,098 B2* | 7/2010 | Baras et al. | 526/249 |
| 7,816,601 B2* | 10/2010 | Carver | 136/201 |
| 8,018,117 B2* | 9/2011 | Makansi | 62/3.1 |
| 8,102,096 B2* | 1/2012 | Makansi | 62/3.1 |
| 8,174,245 B2* | 5/2012 | Carver | 62/3.1 |
| 8,646,282 B2* | 2/2014 | Ilercil et al. | 62/3.1 |
| 8,677,767 B2* | 3/2014 | Ilercil et al. | 62/3.1 |
| 8,695,353 B2* | 4/2014 | Casasanta | 62/3.1 |
| 8,769,967 B2* | 7/2014 | Kruglick | 62/3.3 |
| 2001/0053416 A1 | 12/2001 | Leendertsen | |
| 2002/0090517 A1 | 7/2002 | Zhang et al. | |
| 2006/0000226 A1* | 1/2006 | Weaver, Jr. | 62/3.1 |
| 2006/0130489 A1* | 6/2006 | Weaver, Jr. | 62/3.1 |
| 2007/0167590 A1* | 7/2007 | Baras et al. | 526/249 |
| 2007/0211426 A1* | 9/2007 | Clayton et al. | 361/689 |
| 2007/0211711 A1* | 9/2007 | Clayton | 370/360 |
| 2007/0212902 A1* | 9/2007 | Clayton et al. | 439/66 |
| 2007/0212906 A1* | 9/2007 | Clayton et al. | 439/77 |
| 2007/0212919 A1* | 9/2007 | Clayton et al. | 439/326 |
| 2007/0212920 A1* | 9/2007 | Clayton et al. | 439/326 |
| 2007/0257766 A1* | 11/2007 | Richards et al. | 62/3.1 |
| 2008/0303375 A1* | 12/2008 | Carver | 310/306 |
| 2010/0039208 A1* | 2/2010 | Epstein et al. | 337/21 |
| 2011/0001389 A1* | 1/2011 | Carver | 310/306 |
| 2011/0146308 A1* | 6/2011 | Casasanta | 62/113 |
| 2012/0222427 A1* | 9/2012 | Hassen | 62/3.1 |
| 2014/0182310 A1* | 7/2014 | Ilercil | 62/3.3 |

OTHER PUBLICATIONS

Bharti, V., et al., "Polarization and structural properties of high-energy electron irradiated poly(vinylidene fluoride-trifluoroethylene) copolymer fims", Journal of Applied Physics, Jan. 1, 2000, pp. 452-461, vol. 87 No. 1, American Institute of Physics.

Garret, S.L., et al., "The Power of Sound", American Scientist, 2000, pp. 516-525, vol. 88, Sigma Xi.

Xu, H., et al., "Ferroelectric and electromechanical properties of poly Poly(vinylidene fluoride-trifluoroethylene-chlorotrifluoroethylene) terpolymer", Applied Physics Letters, Apr. 16, 2001, pp. 2360-2362, vol. 78, No. 16, American Institute of Physics.

Wada H., et al., "Giant magnetocaloric effect of $MnAs_{1-x}Sb_x$," Applied Physics Letters, Nov. 12, 2001, pp. 3302-3304, vol. 79 No. 20, American Institute of Physics.

K A Gschneidner Jr. et al., "Recent developments in magnetocaloric materials", Reports on Progress in Physics, 2005, pp. 1479-1539, vol. 68, Institute of Physics Publishing.

Mischenko, A.S., et al., "Giant Electrocaloric Effect in Thin-Film $PbZr_{0.95}Ti_{0.05}O_3$,", Science, Mar. 3, 2006, pp. 1270-1271, vol. 311, www.sciencemag.org.

S. Ashley., "Plastic Coolers", Scientific American, Nov. 2008, pp. 30-31.

Neese, B., et al., "Large Electrocaloric Effect in Ferroelectric Polymers Near Room Temperature", Science, Aug. 8, 2008, pp. 821-823, vol. 321, www.sciencemag.org.

Chu, B., "Enhancement of dielectric energy density in the poly(vinylidene fluoride)-based terpolymer/copolymer blends", Applied Physics Letters, 2008, vol. 93 No. 152903, American Institute of Physics.

Chu, B., "Interfaces in poly(vinylidene fluoride) terpolymer/$ZrO_2$ nanocomposites and their effect on dielectric properties", Journal of Applied Physics, 2009, vol. 105 No. 014103, American Institute of Physics.

* cited by examiner

US 8,869,542 B2

POLYMER-BASED ELECTROCALORIC COOLING DEVICES

CROSS REFERENCE TO RELATED APPLICATIONS

This application claims the benefit of U.S. Provisional Application No. 61/228,885, filed 27 Jul. 2009, and U.S. Provisional Application No. 61/354,967, filed 15 Jun. 2010 the entire disclosures of both of which are hereby incorporated by reference herein.

STATEMENT REGARDING FEDERALLY SPONSORED RESEARCH

This invention was made with government support under DOE Grant No. DE-FG02-07ER46410, awarded by the US Department of Energy, Division of Materials Sciences. The Government has certain rights in the invention.

TECHNICAL FIELD

The present invention relates to polymer based cooling devices or heat pumps that utilize the electrocaloric effect (ECE). That is, polymer materials which generate entropy and temperature change upon the application or removing of voltage or electrical field. More specifically, the present invention relates to a class of polymer based coolants (refrigerant) which exhibit large entropy and temperature changes under the change of external fields, such as fluoropolymers and devices employing such polymer-based coolants.

BACKGROUND

Refrigeration and air conditioning in buildings accounts for approximately 8.5 quads of U.S. primary energy consumption. Most conventional air conditioners and refrigerators achieve cooling through a mechanical vapor compression cycle (VCC). These systems suffer from relatively low efficiency. Typically, the vapor compression refrigerators (VCR) have a coefficient of performance (COP) of 2-4. The COP can be expressed as $COP=Q_c/W$, where $Q_c$ is the heat extracted from the cold end and W is the work required. There does not appear to be any economically viable avenue to markedly improve the efficiency of these VCC systems. Further, air conditioning is a major contributor to electric utility peak loads, which leads to high generation costs and generally use inefficient and polluting generation mechanisms. Peak loads are also a major factor in poor grid reliability. A related problem with today's VCC cooling technology is the adverse environmental impact of the refrigerant gases employed. Even though the hydrofluorocarbon (HFC) refrigerants in the current cooling system are relatively safe for the ozone layer, they are strong green house gases.

These factors necessitate a search for new approaches to increase the energy efficiency of these cooling technologies which are meanwhile environmentally friendly and low cost.

One approach that has gained much attention as a solid state refrigeration technique is the magnetocaloric effect (MCE), which is a magnetic field induced isothermal entropy change and adiabatic temperature change in a magnetic material. (K. A. Gschneidner Jr, V. K. Pecharsky, and A. O. Tsokol, *Rep. Prog. Phys.* 2005, 68, 1479.) Isothermal entropy change ($\Delta S$) from MCE is a result of the change of molecular ordering on a micro or macro scale under the application of a magnetic field or removal of a magnetic field at a constant temperature of the surrounding environment. $\Delta S$ is related to the heat Q extracted from the cold end at a temperature T as $Q=T\Delta S$. The adiabatic temperature change ($\Delta T$) is the change of temperature of the material under the application or removal of a magnetic field without exchanging heat from the surrounding environment. Essentially this effect exists in magnetic materials and it has been found that by operating above the ferromagnetic-paramagnetic transition, a phase transition can be induced by applying or removing a magnetic field, which leads to a large MCE ($\Delta T > 10°$ C. and $\Delta S > 30$ J/(kgK)).

At the current time, the MCE is used only in high end niche applications due to certain short comings such as very high magnetic fields (>5 Tesla), low cooling efficiency (high energy loss to generate high magnetic field).

Accordingly, a need exists for improved and additional techniques and devices that can transfer heat with energy efficiency and in an environmentally friendly manner.

SUMMARY OF THE DISCLOSURE

The present disclosure relates to cooling devices (i.e., refrigerators or heat pumps) that are based on polymers which exhibit a temperature change upon application or removal of an electrical field or voltage. The present disclosure further relates to methods for cooling using such polymers and the polymers themselves.

These and other advantages are satisfied, in part, by a refrigeration device comprising: (i) a polymer which exhibits a temperature change upon application or removal of an electrical field or voltage and (ii) a source of voltage or a source of an electric field that can be applied to the polymer to change the temperature of the polymer which can cool and heat the device. Advantageously, the polymer can be a fluoropolymer or crosslinked fluoropolymer in a single layer or multiple layer form, stretched or unstretched, and with additional components such as in a blend or composite or without additional components. In one aspect of the present disclosure, the polymer exhibits an isothermal entropy change of no less than about 25 J/(kgK), e.g. 25 to about 150 J/(kgK), and/or an adiabatic temperature change of no less than about 8° C., e.g., 8 to about 30° C., when an external electric field or voltage is applied or removed from the polymer.

Embodiments of the present disclosure include wherein the polymer is P(VDF) and/or is made from at least vinylidene fluoride (VDF) and one or more other halogenated monomer, such as chlorofluoroethylene (CFE), chlorotrifluoroethylene (CTFE), hexafluoropropylene (HFP), tetrafluoroethylene (TFE), trifluoroethylene (TrFE), vinylidene chloride (VDC), and vinyl fluoride (VF). In one aspect of the disclosure, the polymer is a copolymer and can be expressed by the formula $P(VDF_x\text{-}TrFE_{1-x})$, wherein x is about 0.50 to 0.99. In another aspect of the disclosure, the polymer is a terpolymer and can be expressed by the formula $P(VDF\text{-}TrFE\text{-}R_x)$ wherein R is a halogenated co-monomer, such as CFE, CTFE, and HFP, and x is in the range from 1 to 15 mol %.

Another aspect of the present disclosure includes methods for cooling a device having a polymer which exhibits a temperature change upon application or removal of an electrical field or voltage, which in turn can remove or heat another device or enclosed area. The method comprises (i) applying an electric field or a voltage to the polymer, and then (ii) removing the electric field or voltage to cool the device.

Another aspect of the disclosure is a mixture of crosslinked fluoropolymer which exhibits a temperature change upon application or removal of an electrical field or voltage. In an embodiment, the mixture includes a copolymer or terpolymer selected from the group consisting of P(VDF-CFE), P(VDF- CTFE), P(VDF-HFE), P(VDF-HFP), P(VDF-TFE), P(VDF-TrFE), P(VDF-VDC), and P(VDF-VF), P(VDF-TrFE-CFE), P(VDF-TrFE-CTFE), P(VDF-TrFE-HFP), P(VDF-TrFE-TFE), P(VDF-TrFE-VDC), P(VDF-TrFE-VF), P(VDF-TFE-CFE), P(VDF-TFE-CTFE), P(VDF-TFE-HFP), P(VDF-TFE-VDC), P(VDF-TFE-VF), and mixtures thereof. Crosslinking of the individual fluorpolymers can be effected by chemical or physical means, including the use of high energy irradiation.

Embodiments include copolymers having from about 10 mol % to 50 mol % of TrFE and terpolymers having from about 0.1 mol % to about 20 mol %, preferably from about 0.1 mol % to about 15 mol %, of CTFE, CFE, HFP, or CDFE. Advantageously, the crosslinked fluoropolymers are in the form of a film or multilayer form and can exhibit large entropy change (isothermal entropy change $\Delta S$>30 J/(kgK), preferably higher than 40 J/(kgK)), and more preferably higher than 50 J/(kgK), and temperature change (adiabatic temperature change) $\Delta T$>10° C., preferably high than 12° C., and more preferably higher than 15° C. under the application of an electric field (and removing the applied electric field) at room temperature (25° C.) or below room temperatures.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout and wherein.

DETAILED DESCRIPTION OF THE DISCLOSURE

Figure 1:
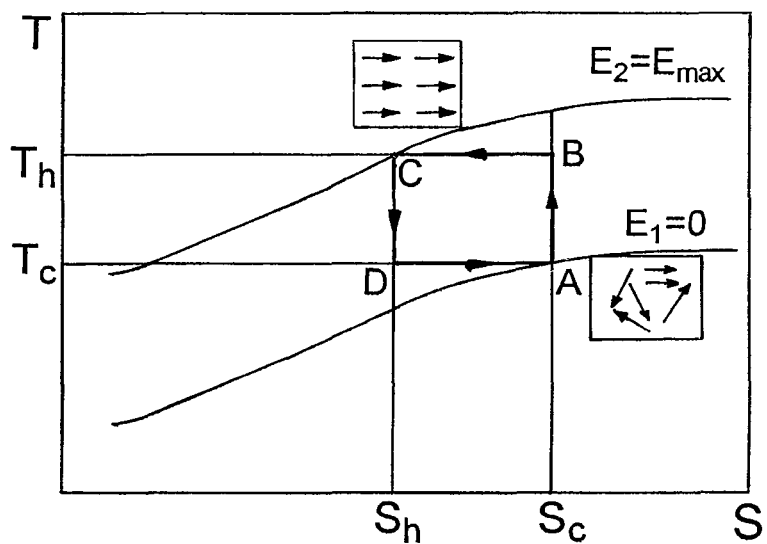
FIG. 1 is a schematic illustration of a sample thermodynamic refrigeration cycle based on ECE effect (similar to a Carnot cycle).

The present disclosure relates to cooling devices (e.g., refrigerators or heat pumps) that are based on polymers which exhibits a temperature change upon application or removal of an electrical field or voltage, e.g., polymers that exhibit an electrocaloric effect (ECE). The ECE cooling capability of such polymers is an improvement over other forms of cooling devices. The operation temperature of devices employing ECE polymers can be adjusted at room temperature, below room temperature, or above room temperature by varying the composition and processing of the polymers.

Similar to the MCE, the electrocaloric effect is an isothermal entropy change and adiabatic temperature change but occurs in a material when an electrical field (or voltage) is applied or removed. When the polymer is under no applied electric field (or voltage), there are random orientations of dipoles or a high degree of disorder (high entropy state). Application of an electric field (or voltage) to the polymer induces the dipole ordering and consequently causes a decrease in entropy (heating of the surroundings). The process also works in the reverse direction starting with the material under electric field in a low entropy state. When the field is removed, the dipoles become disordered and there is an increase in entropy and enthalpy (absorbing heat and cooling of the surroundings). The ECE can be very high in ferroelectric materials, e.g., ferroelectric polymers, where by operating near the Curie temperature where phase transition can be induced by applying or removing an electric field. The electrocaloric effect is attractive because it provides a very efficient means to realize solid state cooling for a broad range of applications such as on-chip cooling and temperature regulations for sensors, electronic devices, and medical specimens. Furthermore, refrigeration based on the ECE approach is more environmentally friendly and hence can also provide an alternative to the existing vapor-compression approach. Compared with MCE, ECE is much more convenient to use and offers much better energy efficiency since it is much easier to apply an electrical field to a polymer and the ECE materials in the present disclosure are good insulating materials which eliminate the Joule loss occurring in MCE materials.

In an embodiment of the disclosure, a cooling device comprising (i) a polymer which exhibits a temperature change upon application or removal of an electrical field or voltage which can be in thermal connection with a cooling load or heat sink of the device, (ii) a source of voltage that can be applied to the polymer to change the temperature of the polymer and to cool or heat the cooling load of the device, and optionally, (iii) a source of electric field to displace the polymer from the cooling load and/or heat sink in the device. The device can remove heat or add heat to another device, such as a microelectronic device, or can be used to cool or heat an enclosed area. Advantageously, the polymer can be a fluoropolymer, a crosslinked fluoropolymer, or a fluoropolymer that has been subjected to high energy irradiation. The polymer can be in a single layer or multiple layer form, stretched or unstretched, and with other components such as a in a blend or composite or without additional components. Advantageously, the polymeric materials employed can also undergo a strain induced displacement by the application of a separate electric field which can induce a displacement strain in the polymer.

In one aspect of the disclosure, the device includes a plate or such structure than can maintain a thermal gradient to act as the cooling load which can be in thermal contact with the polymer layer. The displacement of the polymer from the plate coupled with the temperature change of the polymer by application and removal of the electrical field or voltage produces heat transfer between the polymer and plate and consequently heat transfer from a cold temperature to a hot temperature, creating refrigeration.

In an embodiment of the present disclosure, the polymeric materials employed in the devices exhibit large entropy change (isothermal entropy change $\Delta S > 30$ J/(kgK), preferably higher than 40 J/(kgK)), and more preferably higher than 50 J/(kgK), and temperature change (adiabatic temperature change) $\Delta T > 10°$ C., preferably high than 12° C., and more preferably higher than 15° C. under the application of an electric field or voltage (and removal thereof) at room temperature (25° C.) or below room temperatures. Such electric fields or voltages can be applied or removed in the range of 50 MV/m to 250 MV/m for the electric field and 10 volts to 2,000 volts for the voltages.

To aid the understanding of how the ECE polymers function in a solid state refrigeration device, FIG. 1 schematically illustrates a possible thermodynamic refrigeration cycle based on ECE effect (similar to a Carnot cycle). As shown in the figure, from the path of A to B and then B to C, an applied electric field is raised from $E_1$ to $E_2$, which induces a polar-ordered phase. From A to B, the ECE material experiences an adiabatic temperature change $\Delta T_{hc}$ from $T_c$ to $T_h$, and then from B to C, it ejects heat (entropy) to the heat sink at $T_h$ while the material entropy is reduced from $S_c$ to $S_h$ (isothermal entropy change $\Delta S$). From the path of C to D and then D to A, the applied electric field is reduced from $E_2$ to $E_1$ and the ECE material loses polar-ordering. Accompanying this, the ECE material experiences a decrease in temperature from $T_h$ to $T_c$ from C to D (adiabatic temperature change) and then absorbs heat (entropy) from the cold load (isothermal entropy change). Because the ECE materials of interest are insulators, the above electric field (refrigeration) cycle has the potential of very low electric loss from electrical conduction and consequently, the cooling devices based on the ECE have the potential to reach very high efficiency.

In the operation of a refrigeration cycle, the working material (refrigerant) must absorb entropy (or heat) from the cooling load while in thermal contact with the load (isothermal entropy change $\Delta S$). The material is then isolated from the load while the temperature is increased due to application of external field (adiabatic temperature change $\Delta T$). The material is then in thermal contact with the heat sink and the entropy that was absorbed from the cooling load is then ejected to the heat sink. The working material is then isolated from the heat sink and the temperature is reduced back to the temperature of the cooling load as the field is reduced and the process is repeated. This thermodynamic process is schematically illustrated in FIG. 1. Both the isothermal entropy change $\Delta S$ and the adiabatic temperature change $\Delta T$ are the key parameters for the refrigerant to be developed for effective refrigeration. A refrigeration system including refrigerants in which entropy and temperature can be changed by external field and thermal switches which transport the entropy from the cold end to the hot end is provided in the present disclosure. Advantageously, the polymers of the present disclosure can be used as the refrigerants is known solid state designs but which display very large $\Delta S$ and $\Delta T$ under the application or removing of an electrical field or stress field.

The entropy change in a solid insulator such as the polymer dielectrics to be described below is related to the change in the electric displacement by, $$\Delta S = -\frac{1}{2}\beta\Delta D^2 \quad (1)$$

where $\Delta S$ is the isothermal entropy change, $\beta$ the phenomenological parameter ($\beta(T-T_0)$ is the coefficient of phenomenological coefficient of $D^2$ in the phenomenological expansion of free energy $G=G_0+1/2\beta(T-T_0)D^2+1/4\xi D^4+1/6\zeta D^6$, $G_0$—free energy of paraelectric phase, $T_0$—Curie-Weiss temperature, D—electric displacement, $\xi$, $\zeta$—coefficients), $\Delta D$ is the change of electric displacement. (M. Lines and A. Glass, *Principles and Applications of Ferroelectrics and Related Materials* Clarendon Press, Oxford, 1977, 148-150 p.; F. Jona and G. Shirane, *Ferroelectric Crystals*, Dover Publications, Inc. New York, 1993, 134-135 p.)

The adiabatic temperature change can be described as $\Delta T$ ($=T\Delta S/c_E$), $$\Delta T = -\frac{1}{2c_E}\beta T \Delta D^2. \quad (2)$$

Here, $c_E$ is the heat capacity, $\beta$ is a parameter which measures how effective a polymeric material (e.g., ferroelectric material) is in generating ECE and a dielectric material with a large $\beta$ has potential to display a large $\Delta S$ if a high D can be induced. As the material develops a polar-phase, its entropy will decrease and Eq. (1) indicates that this entropy change is proportional to the square of the electric displacement change. Ferroelectric polymers possess large D and if the material also possesses large $\beta$, a high ECE can be achieved.

In one aspect of the present disclosure, the polymer employed in a solid state refrigeration device can be fluoropolymer which exhibits a temperature change upon application or removal of an electrical field or voltage. The fluoropolymer can be crosslinked or in an uncrosslinked form, in a single layer or multiple layer form, stretched or unstretched, and with other components such as a in a blend or composite or without additional components.

The fluoropolymers include PVDF and polymers made from at least vinylidene fluoride (VDF) and one or more other halogenated monomer, such as chlorofluoroethylene (CFE), chlorotrifluoroethylene (CTFE), hexafluoropropylene (HFP), tetrafluoroethylene (TFE), trifluoroethylene (TrFE), vinylidene chloride (VDC), and vinyl fluoride (VF) and mixtures thereof. In one aspect of the disclosure, the polymer is a copolymer and can be expressed by the formula P(VDF$_x$-TrFE$_{1-x}$), wherein x is about 0.50 to 0.99. In another aspect of the disclosure, the polymer is a terpolymer and can be expressed by the formula P(VDF-TrFE-R$_x$) wherein R is a halogenated co-monomer, and preferably a bulky co-monomer, i.e., a co-monomer having a size which is greater than VDF, such as CFE, CTFE, and HFP, and x is in the range from about 1 to about 15 mol %, e.g., in the range from 1 to 10 mol %.

In one embodiment of the disclosure, the fluoropolymer is a copolymer selected from the group consisting of: P(VDF-CFE), P(VDF-CTFE), P(VDF-HFP), P(VDF-TFE), P(VDF-TrFE), P(VDF-VDC), P(VDF-VF), and mixtures thereof; or a terpolymer selected from the group consisting of: P(VDF-TrFE-CFE), P(VDF-TrFE-CTFE), P(VDF-TrFE-HFP), P(VDF-TrFE-TFE), P(VDF-TrFE-VDC), P(VDF-TrFE-VF), P(VDF-TFE-CFE), P(VDF-TFE-CTFE), P(VDF-TFE-HFP), P(VDF-TFE-VDC), P(VDF-TFE-VF), and mixtures thereof. In one aspect, wherein the terpolymer is polyvinylidene fluoride-trifluoroethylene-chlorofluoroethylene having a ratio of monomers represented as P(VDF$_x$-TrFE$_y$-CFE$_{1-x-y}$), wherein x is about 0.50 to about 0.85, and y is about 0.15 to about 0.5.

The polymers of the present disclosure can be used a single material or in combination with other materials such as other polymers exhibiting an ECE effect. In one aspect, the polymers can be crosslinked by chemical and/or physical means.

For example, ferroelectric polymers such as poy(vinylidene-fluoride) (PVDF) and its copolymers with trifluoroethylene (TrFE) (P(VDF-TrFE)) can generate large ECE, as have been observed earlier (B. Neese, B. J. Chu, S. G. Lu, Y. Wang, E. Furman and Q. M. Zhang, *Science* 2008, 321, 821; and U.S. Provisional Patent Application No. 61/228, 885). More recently, using a direct measurement technique, it was discovered that giant ECE can be obtained with high energy irradiated fluoropolymers and crosslinked fluoropolymers, such as high energy irradiated and crosslinked P(VDF-TrFE) copolymers and terpolymers of P(VDF-TrFE-CFE) (CFE: chlorofluoroethylene), and blends of P(VDF-TrFE-CFE) with small amount of P(VDF-CTFE) (CTFE: chlorotrifluoroethylene). In addition, terpolymers of P(VDF-TrFE-CFE) or P(VDF-TrFE-CTFE) can be blended with a small amount of P(VDF-CTFE), or terpolymer nanocomposites with small amount of oxide nanoparticles which can improve the electric displacement D and hence generate large ECE. (Baojin Chu, B. Neese, Minren Lin, Sheng-Guo Lu, and Q. M. Zhang. *Appl. Phys. Lett.* 2008, 93, 152903; B. Chu, M. Lin, B. Neese, and Q. M. Zhang. *J. Appl. Phys.* 2009, 105, 014103.). In an embodiment of the present disclosure, the fluorpolymers can be crosslinked by applying high energy irradiation to the polymer, such as with gamma rays and electron beams. High energy irradiation of such polymers can also cause additional structural changes in the polymers which may be beneficial for use of the polymers in cooling devices. The fluoropolymers can also be crosslinked chemically, such as by thermal or radiation induced crosslinkers.

The experimental data as well as basic materials considerations indicate that in specially designed polymers, a large temperature change and large entropy change, can be achieve under external fields. As will be shown by the examples in this disclosure, compared with the terpolymer and their blends, high energy electron irradiated fluoropolymers and crosslinked fluoropolymers exhibit higher ECE. The ECE of normal ferroelectric copolymers P(VDF-TrFE) 55/45 mol % and relaxor ferroelectric terpolymers P(VDF-TrFE-CFE) 59.2/33.6/7.2 mol % was reported in U.S. Provisional Patent Application 61/228,885. Both materials demonstrated large ECE, i.e. entropy change greater than 50 J/(kgK), and temperature change greater than 12° C. at temperatures higher than 70° C. For copolymers, the results derived from Maxwell relations and are confirmed by the direct measurements on ΔT and ΔS. However, for relaxor ferroelectric terpolymers, the direct measurements of ECE, as presented here, reveal that the polymer can generate much larger ECE at room temperature compared with what were deduced from the Maxwell relations. This is a positive result but also indicates that the Maxwell relations can not be used reliably to deduce ECE from the relaxor ferroelectric polymers.

The results obtained demonstrate that a large ECE can be generated near room temperature. The polymers of the present disclosure can be used as the refrigerant for cooling devices (K. A. Gschneidner Jr, V. K. Pecharsky, and A. O. Tsokol, *Rep. Prog. Phys.* 2005, 68, 1479.).

Figure 9:
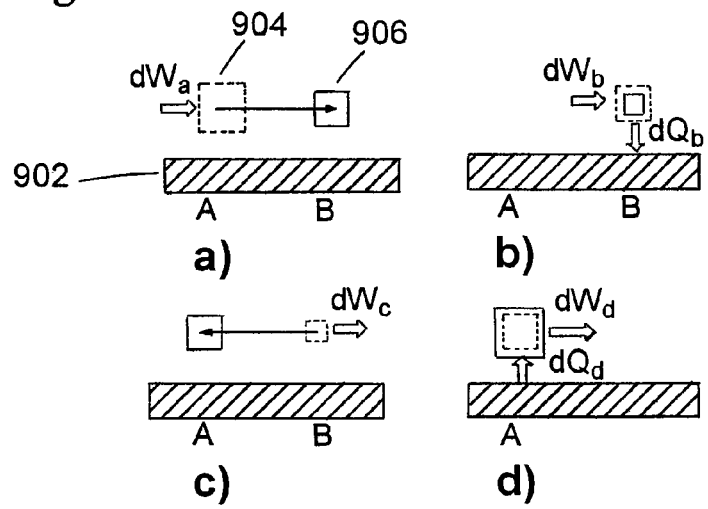
FIG. 9 is an illustration of the operation of a thermoacoustic cooler.
Figure 10:
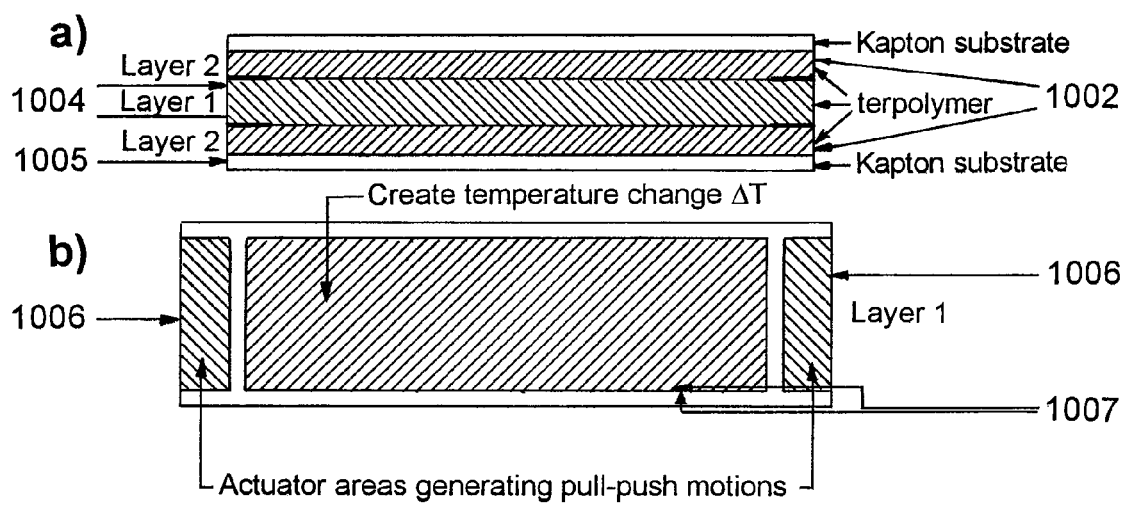
FIG. 10 is a schematic illustration of a design for a cooling system employing polymers which exhibits a temperature change upon application or removal of an electrical field or voltage.
Figure 11:
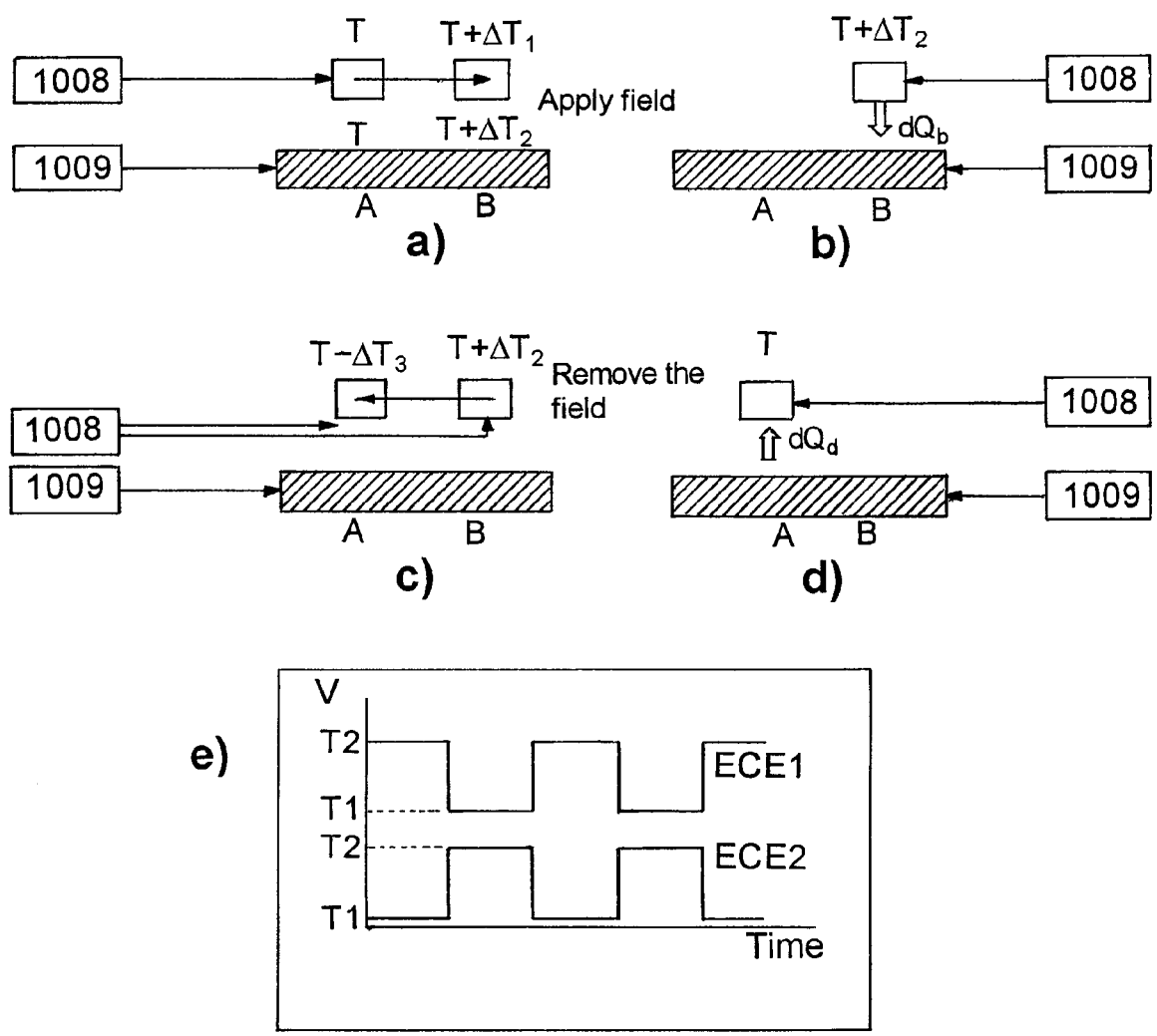
FIG. 11 is a schematic illustration of the operation of a cooling system employing polymers that exhibit electrocaloric effect.

The large ECE, coupled with the electromechanical strain in certain of these polymers, can lead to new refrigeration and cooling devices. One example is illustrated in FIGS. 9, 10 and 11. Additional example includes the refrigeration cycle illustrated in FIG. 1 in which the switch of the refrigerant between T$_h$ and T$_c$ can be accomplished by the electromechanical strain in these polymers, without using external motion devices or other heat exchanges. In 1998, Zhang et al. discovered the relaxor properties of high-energy electron irradiated P(VDF-TrFE) copolymers, their strain could reach 4%, and the dielectric properties were also enhanced. (Q. M. Zhang, V. Bharti, and X. Zhao. *Science* 1998, 280, 2101.) Afterwards, through doping with CFE (chlorofluoroethylene), P(VDF-TrFE) can be modified into a relaxor ferroelectric, i.e. terpolymer P(VDF-TrFE-CFE). (H. S. Xu, Z. Y. Cheng, D. Olson, T. Mai, Q. M. Zhang, and G. Kavarnos. *Appl. Phys. Lett.* 2001, 78, 2360.) The property/structure relationships aid in designing ECE materials system, which are being used in a way that was not reported by these publications. Thus, considering all the factors affecting ECE, high energy irradiated P(VDF-TrFE) copolymers, P(VDF-TrFE-CFE) or P(VDF-TrFE-CTFE) terpolymers, blends of P(VDF-TrFE-CTFE) or P(VDF-TrFE-CFE) with small amount of P(VDF-CTFE) (CTFE-chlorotrifluoroethylene) (less than 10 mol %) were chosen as material systems for large ECE cooling devices in one aspect of the disclosure.

Here, the ECE in the relaxor ferroelectric polymers of P(VDF-TrFE-CFE) and crosslinked (via irradiation in this embodiment) P(VDF-TrFE) copolymers near room temperature are presented. The dielectric constant maximum can be shifted by varying the composition and the crosslinking density (coefficient), which can be effected by physical means, irradiation, and/or chemical means, and hence the ECE operation temperature range of these polymers can be tailored.

Figure 12:
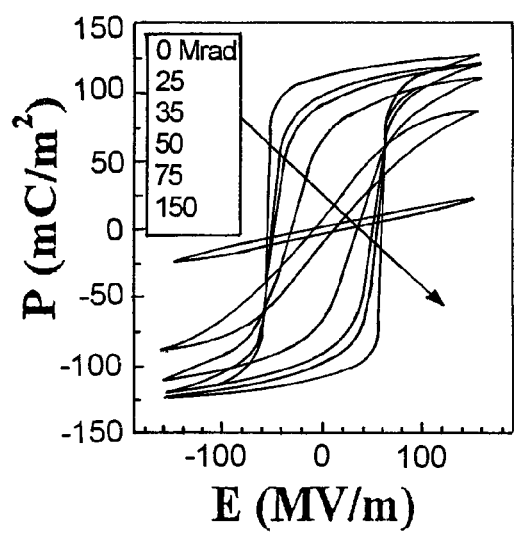
FIG. 12 (a) is a chart showing the ferroelectric hysteresis loops of P(VDF-TrFE) 68/32 mol % copolymer under different high energy electron irradiation dose (electron energy is 1.2 MeV) and (b) is a chart showing the correlation of the crosslinking coefficient and the irradiation dose in P(VDF-TrFE) copolymers. The data in (a) are from the stretched P(VDF-TrFE) copolymer films. The example here illustrates the function of irradiation in affecting the ferroelectric properties.
Figure 12:
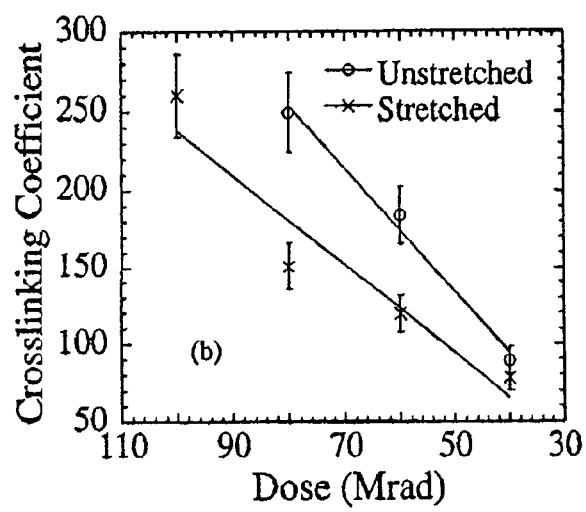

FIG. 12 shows a chart of (a) the polarization loops of the high energy electron irradiated P(VDF-TrFE) 68/32 copolymers under different high energy electron irradiation dose (electron energy is 1.2 MeV) to crosslink the polymer. The blue loop is for 0 dose, red loop is for 75 Mrad dose, and purple loop is for 175 Mrad dose. The data in (a) are from the stretched P(VDF-TrFE) copolymer films. The example here illustrates the function of irradiation in affecting the ferroelectric properties. FIG. 12 (*b*) shows the crosslinking coefficient as a function of radiation dosage for the irradiated P(VDF-TrFE) copolymer. In one aspect of the present disclosure, the fluoropolymer can have a crosslinked coefficient between about 50 to about 250. Such a crosslinked coefficient can be determined as known in the literature. (See Bharti et al, J. Appl. Phys., (2000) vol 87, 452-453)

Figure 2:
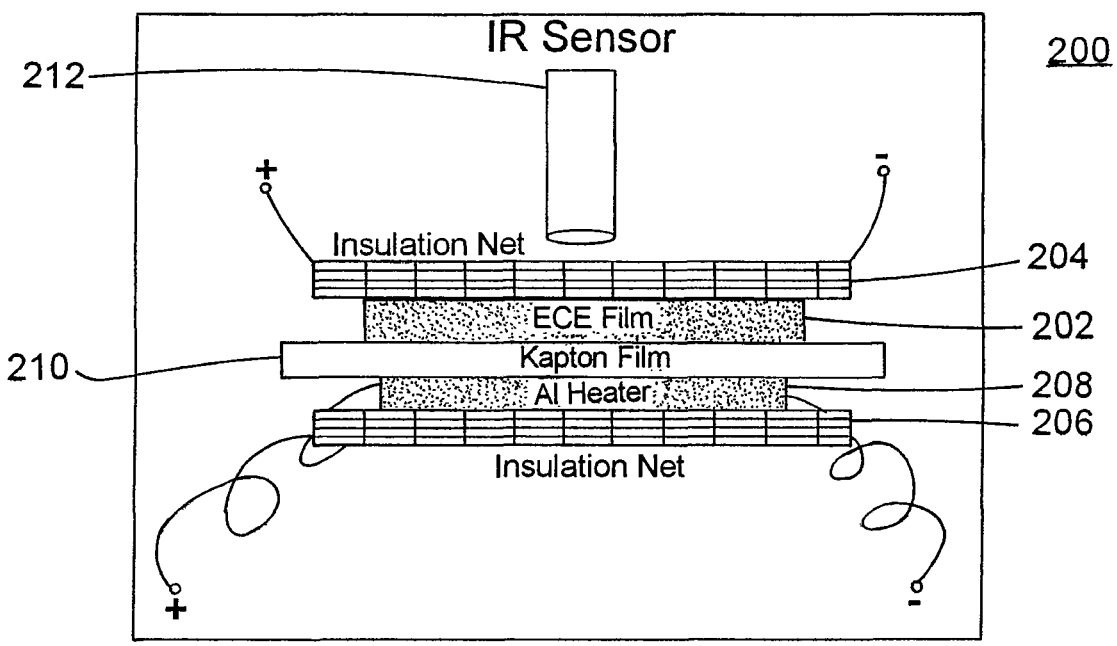
FIG. 2 shows the sample system configuration for direct ECE measurement.

FIG. 2 is a schematic drawing of a sample configuration (200) for the direct measurement of the ECE in films. For thermal insulation, the ECE film sample (202) is placed between two netted plastic frames (204, 206). A thin aluminum layer (208) was deposited on the Kapton film (210) to form a resistor heater, which is used to produce a reference heat signal for the ECE measurement. A commercial infrared (IR) temperature sensor (212) is used to detect the temperature change produced by the Al resistor heater as well as the ECE materials, from which output signal is recorded by an oscilloscope and computers (not shown for illustrative convenience).

In preparing the measurement device of FIG. 2, the ECE film was glued onto the top surface of the Kapton film, the Al film heater was evaporated on the bottom surface as a heater to produce a certain amount of entropy. The whole sample was placed in between two netted plastic frames to isolate from the other objects and materials in the vacuum chamber.

Here, we briefly explain the principle used for the direct ECE measurement. When a voltage V with a time duration t passes through the resistor heater, it will produce a joule heat $Q_h$ $$Q_h = \frac{V^2}{R}t. \quad (3)$$

The heat will generate a temperature change in the ECE film sample system and this temperature change is detected by an IR temperature sensor (or a thermal couple attached to the sample system), shown in FIG. 2. Now if the ECE sample under an applied electric field also generates the same value of temperature change, then the effective heat $Q_{ECE}$ from the ECE material is equal to $Q_h$, and then $Q_h = Q_{ECE} = T\Delta S$, where $\Delta S$ is the isothermal entropy change. If the ECE material has a heat capacity of $c_E$, a density $\rho$, and a volume of U, then the adiabatic temperature change can be obtained by the following expression:

$$\Delta T_{ECE} = Q_{ECE}/(c_E \rho U) \quad (4).$$

Figure 3:
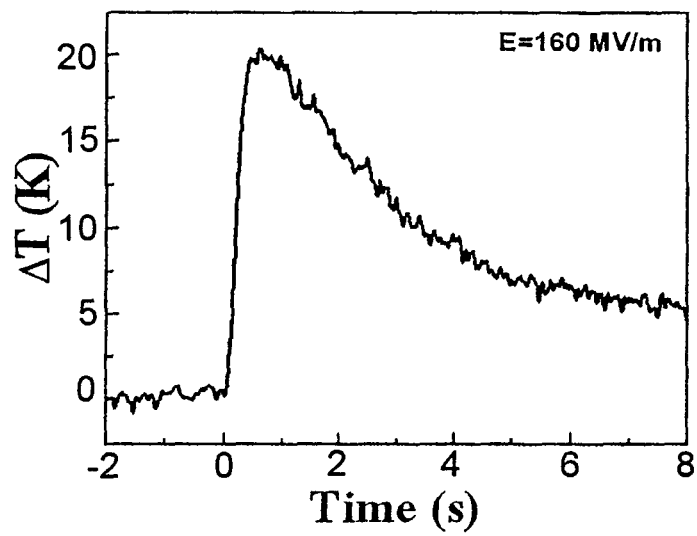
FIG. 3 is a chart of temperature change as a function of time when a step voltage is applied to a fluoropolymer film. The polymer film in this figure comprises a crosslinked P(VDF-TrFE) 68/32 mol % copolymer.
Figure 4:
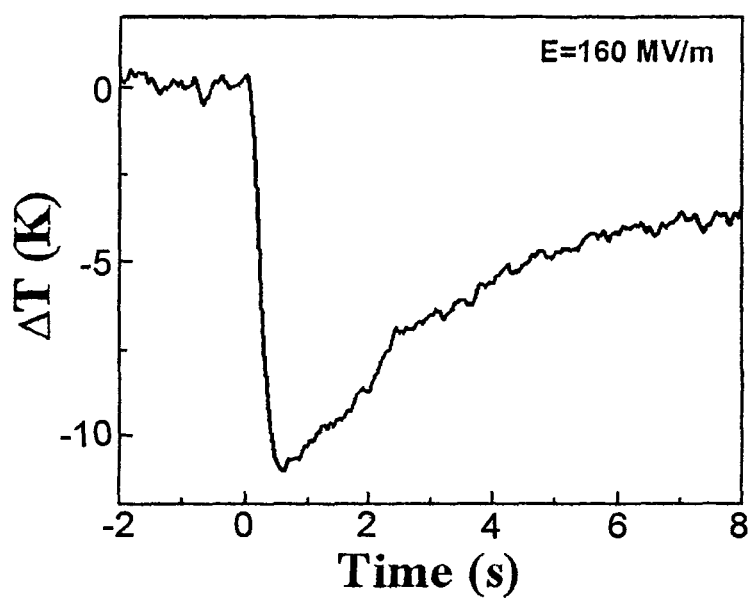
FIG. 4 is a chart of temperature change as a function of time when a step voltage (160 MV/m electric field) is removed from the polymer film as described in FIG. 3.

FIGS. 3 and 4 show the temperature change that was measured when a step voltage was applied to and removed from an ECE film (a high energy electron irradiated P(VDF-TrFE) 68/32 copolymer) in the system. FIG. 3 illustrates the temperature as a function of time when a step voltage is applied to the polymer film, causing heating of the sample assembly. As shown in the figure, the high temperature will then be dissipated with time by slow thermal conduction to the environment. FIG. 4 shows the temperature change as a function of time when a step voltage (160 MV/m electric field) is removed from the polymer film, causing cooling of the sample assembly. As shown in this figure, the temperature will be increased in an exponential form due to the weak thermal link to the external environment.

Figure 5:
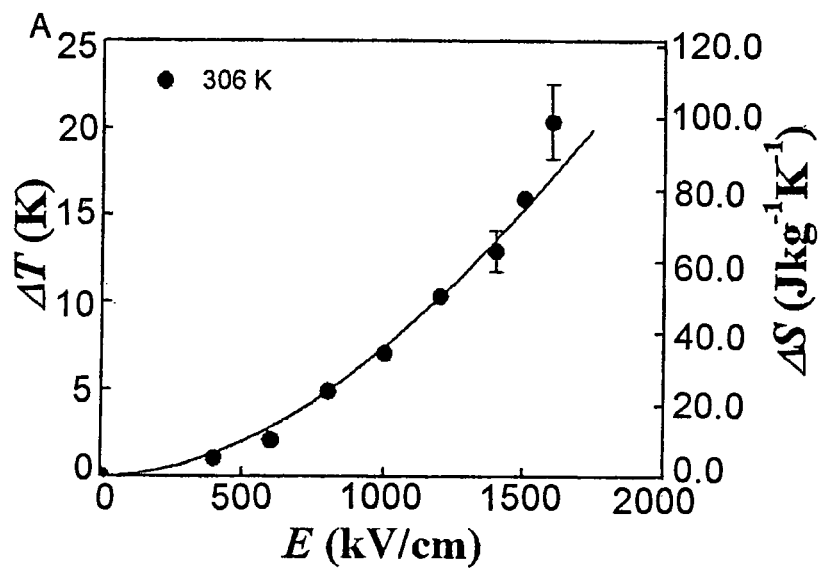
FIG. 5 is a chart for directly measured $\Delta T$ and $\Delta S$ as a function of electric field for a high energy electron irradiated P(VDF-TrFE) 68/32% copolymer. The measurement was carried out at 33° C. The electron energy is 1.2 MeV and irradiation dose is 75 Mrads.

FIG. 5 presents the ECE data directly measured at 306 K (33° C.) on a high-energy electron irradiated P(VDF-TrFE) 68/32 mol % copolymer where a ΔT of 20 K can be achieved, which means when an electric field of 160 MV/m is applied to the ECE film, its temperature will rise from 33° C. to 53° C. At 33° C., when the applied field of 160 MV/m is reduced to zero, the ECE film temperature is reduced from 33° C. to 13° C., causing cooling.

Figure 6:
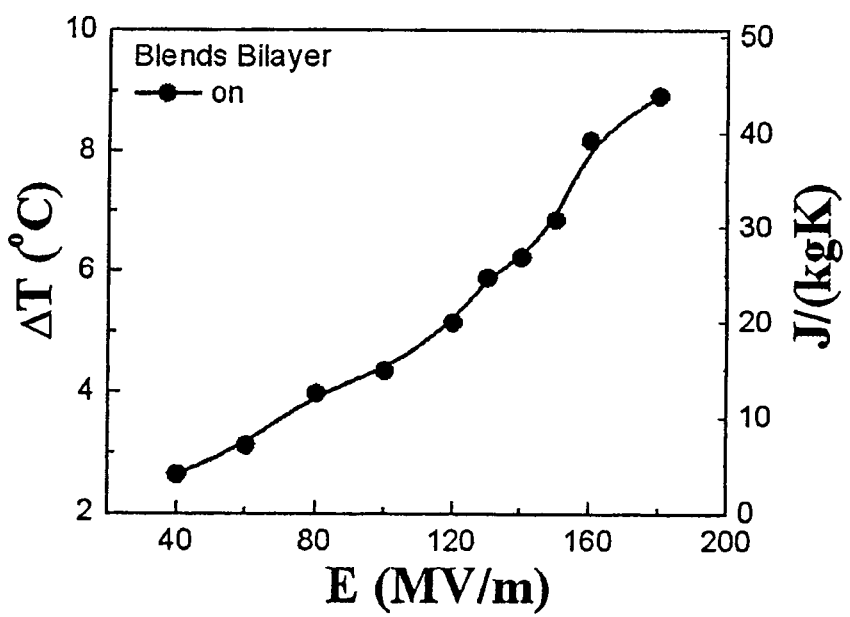
FIG. 6 is a chart demonstrating directly measured $\Delta T$ and $\Delta S$ as a function of electric field for bilayer P(VDF-TrFE-CFE)-P(VDF-CTFE) blends. The measurement was carried out at about 23° C.
Figure 7:
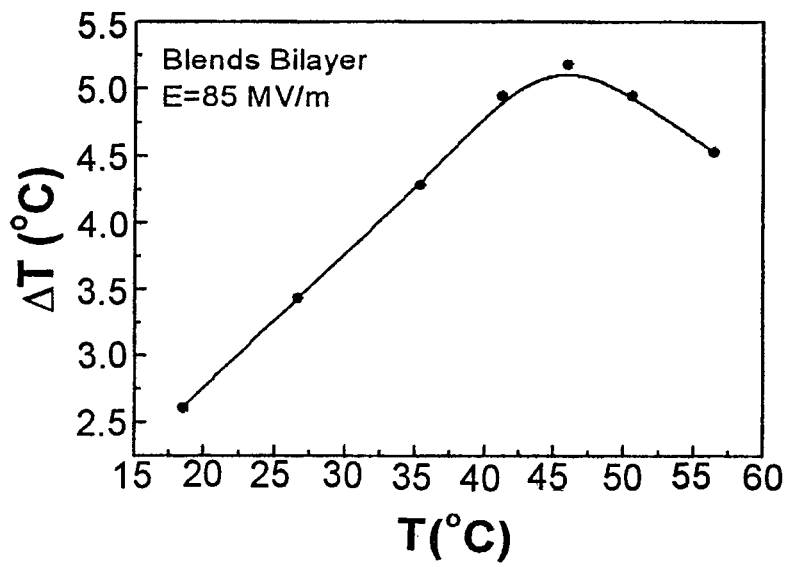
FIG. 7 is a chart showing directly measured $\Delta T$ as a function of temperature for a P(VDF-TrFE-CFE)-P(VDF-CTFE) blends (95/5 wt % ratio between the two polymers). The electric field used is 87 MV/m.
Figure 8:
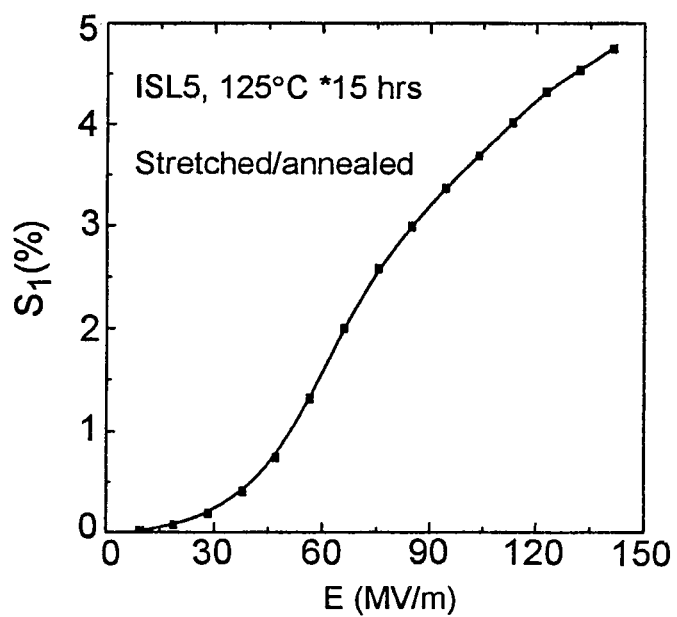
FIG. 8 is the plot of transverse strain as a function of electric field for a P(VDF-TrFE-CFE) terpolymer, which shows these polymers also exhibit large electrostrictive strain and can be employed in a solid state cooling device.

FIG. 6 is a chart showing directly measured ΔT and ΔS as a function of electric field for bilayer P(VDF-TrFE-CFE)-P (VDF-CTFE) blends, i.e., blends of P(VDF-TrFE-CFE) 59.2/33.6/7.2 mol % with P(VDF-CTFE) 91/9 mol %. The ratio of the two polymers is 95/5 wt % in the blend films. The measurement was carried out at about 23° C. As shown in this figure, a bilayer of fluoropolymers can exhibit a temperature change of from about 3° C. to about 9° C. upon the application of about 40 to about 180 (MV/m). FIG. 7 is a chart showing the results of directly measured ΔT as a function of temperature for the P(VDF-TrFE-CFE)-P(VDF-CTFE) blends (95/5 wt % ratio between the two polymers). The electric field used was 87 MV/m. In addition to exhibiting a large ECE, the fluoropolymers of the present disclosure, such as high energy electron irradiated copolymers and P(VDF-TrFE-CFE) terpolymer and alike, also exhibit large electrostrictive strains which can be used in one type of cooling device in the present disclosure. See, e.g., FIG. 8 is the plot of transverse strain as a function of electric field for a P(VDF-TrFE-CFE) terpolymer, which shows these polymers also exhibit large electrostrictive strain and can be used in one type of the solid state cooling device in the present disclosure.

Another aspect of the present disclosure includes methods for cooling a device having a polymer which exhibits a temperature change upon application or removal of an electrical field or voltage, which in turn can remove or heat another device or enclosed area. The method comprises (i) applying a electric field or a voltage to the polymer, and then (ii) removing the electric field or voltage to cool the device. In one aspect of the disclosure, the method includes thermally contacting the polymer to a heat sink, applying an electric filed or a voltage to the polymer and ejecting any heat from the polymer to the heat sink; isolating the polymer from the heat sink, removing the applied electric field or voltage from the polymer to cool the polymer, and thermally contacting the polymer to a cooling load to remove heat from the cooling load. These steps need not be performed in the order described. The sequence of steps depends on the design choice for a given cooling device. Further the sequence of steps can be repeated to permit a continuous operation. Advantageously, the polymers of the present disclosure can be isolated from and put in contact with the heat sink and/or cooling load by the application of a separate electric field which can induce a displacement strain in the polymer.

One alternative cooling process is based on the thermoacoustic cooling. See, e.g. FIG. 9, which illustrates the operation of a thermoacoustic cooler. In the figure, the shaded plate (902) maintains a temperature gradient. The dashed and solid squares in figures (b) and (d) (904, 906) illustrate the volume change of the fluid parcel due to the heat exchange with the plate. dW indicates the works exchanged between the gas parcel and the surrounding. (S. L. Garret and S. Backhaus, *Am. Scient.* 2000, 88, 516.)

One key component of a cooling device is the transportation of entropy from the cold end to the hot end. The objective is to transport entropy from one temperature level to another temperature level in a reversible manner, that is, to transport the entropy without generating any additional entropy in the process. This requires a substance whose entropy depends on some property other than temperature. This substance is the ferroelectric polymer, in which entropy can be changed by external electric field (ECE effect).

A brief review of the operating principle of the thermoacoustic cooler, which has been developed for more than 40 years and has reached relative maturity, will help explain the micro-heat transporting process in the proposed cooling system. As illustrated in FIG. 9, the basic unit of a thermoacoustic cooler consists of a working fluid experiencing compression and expansion in contact with a plate (a stack) that maintains a thermal gradient $\Delta T_m/L$ where L is the stack length and $\Delta T_m$ is the temperature difference between the hot and cold ends ($T_H$-$T_C$). As the fluid is compressed and expanded, it undergoes a temperature change, as illustrated in FIG. 9, resulting in heat transportation from low temperature to high temperature. When following a fluid parcel, there are four steps in this heat transportation process. (1) In the first step, the fluid is compressed and moved to right (FIG. 9 (a)) and the temperature of the compressed fluid is raised; (2) In the second step, if the fluid temperature is higher than the local temperature (point B) in the plate, heat $dQ_b$ will be transferred from the fluid to the plate to reach the temperature of the plate (FIG. 9 (b)); (3) In the third step, the fluid parcel is moved to the left to the point A and is expanded which causes the lowering of the fluid temperature (FIG. 9 (c)); And (4) In the fourth step, if the temperature of the fluid parcel is lower than the local temperature of the plate at the point A, heat $dQ_d$ will be transferred from the plate at the point A to the fluid parcel to reach equilibrium. Integration of all the fluid parcels along the plate has the net effect that the heat is transferred from the cold end of the plate to the hot end. The function of the fluid parcel is two folds: causing local adiabatic temperature change and moving with respect to the plate to transfer the heat. Although for each fluid parcel, the temperature change during this cycle is small, adding all the parcels together along the plate leads to a large temperature difference between the cold and hot ends (>50° C. can be achieved).

By making use of the large ECE which creates entropy change and electromechanical strain capability which transfers entropy from a cold end to a hot end, cooling device can be made, for example, as illustrated in FIGS. 10 and 11. In the solid state cooling system in this disclosure, the relaxor ferroelectric polymer will replace the fluid and we will utilize the electrocaloric effect, rather than the thermoelastic effect, to induce the temperature change in the ferroelectric polymer film. The large electromechanical effect in the relaxor ferroelectric polymer will be employed to induce the relative motion between the ferroelectric polymer layer and the plate. This approach has many advantages over the thermoacoustic cooling system.

FIG. 10 is a schematic illustration of one proposed design of the cooling system (a, top) a three layer ribbon with both the layers 2 (1002) and the layer 1 (1004) the ECE polymer films in this invention. In the bottom of FIG. 10, (b, bottom), the electrode pattern on the layer 1 (1004) in which the middle large part induces the temperature change through the electrocaloric effect and the two small ends generate strain to create the relative motion of the layer 1 with respect to the plates 2 (1002). Because of the large strain, the electroded actuator area at the two ends (1006) can be very small (1 mm length can generate 50 μm maximum displacement. The device needs less than 5 μm relative motion between the two layers. FIG. 11 is the schematic illustration of the operation of an electrocaloric effect cooler. The ECE and displacement strain quantities can be controlled independently for certain of the fluoropolymers (i.e., the ferroelectric polymers) of the present disclosure. The ECE film (1008) under electric field can have a temperature increase from the electrocaloric effect and a relative displacement with respect to the plate (1009) from the strain. On the other hand, when the field is removed and the ECE layer (1008) is translated from B to C, the ECE layer can absorb heat from the surrounding. In this example, only the layer 1 in FIG. 10 creates temperature change. However, one can also induce the temperature change in the layer 2 (1009), which will increase the heat transfer between the two layers and hence increase the cooling power. In this case, the voltages (or fields) in the two ECE layers are out of phase as illustrated in d) as an example. The basic operation principle of the solid state cooling ribbons is shown in FIG. 10 and FIG. 11. The plate (hatched area) maintains a temperature gradient of $(T_H$-$T_L)/L$. When an electric field is applied to the ECE film, the electrocaloric effect induces a temperature rise in the ECE film. By following the motion and temperature change of a small volume element of the ECE film, one can trace the 4 steps very similar to these shown in FIG. 9. The only difference is the temperature change in the device is induced by the electrocaloric effect in the ECE layer and therefore the magnitude of temperature change can be varied independent of the strain or the displacement. In addition, the ECE layer can be in a multilayer form which allows a temperature profile in perpendicular to the interface between the relaxor terpolymer and the plate that can be controlled by the designer. This additional degree of freedom could further improve the efficiency and performance.

The performance of the cooling system can be deduced. If operating at 1 kHz, the heat flux is 0.5 $\Delta Q$ v (in the discussion here, amplitude rather than rms value is used), where $\Delta Q$ is the heat transferred and v is the strain velocity (=ωu, where ω is the angular frequency and u is the displacement). To deduce $\Delta Q$ and its relation to the applied field, we note that the heat released at a constant temperature as an electric field of 100 V/μm is applied is 20 J/cm$^3$. Therefore, for the device operated under 10 V/μm field, $\Delta Q$ is about 2 J/cm$^3$. For a 5 μM displacement and 1 kHz operation frequency, the heat flux is 3.1 W/cm$^2$. As for the input electric power, the ECE film is a dielectric material and as a capacitor, the net power consumption in the polymer is zero when averaged over one cycle and excluding all the losses (mostly the dielectric loss). Therefore, the proposed solid state heat pump has the potential to achieve very high COP (COP=heat pumped/(electric input power)). For a 10 V/μm field at 1 kHz, the input electric power density can be estimated to be 11 W/cm$^3$ (dielectric constant=50). A dielectric loss of 5% at 1 kHz leads to a power loss of 0.55 W/cm$^3$ (3.1 Watts pumped vs. 0.55 Watts net input power, COP=5.6), which represents a much better performance in comparison with the solid state thermoelectric cooler.

The data listed in Table I summarizes the ECE results from the high energy electron irradiated P(VDF-TrFE) copolymer and P(VDF-TrFE-CFE) terpolymer and compares them with the-state-of-the-art ECE and MCE materials from the literature. Here we also introduce a coefficient refrigerant capacity (RC)=$\Delta S \cdot \Delta T$ to compare different refrigerants. Both polymers have great advantage over the best mCE material (PbZr$_{0.95}$Ti$_{0.05}$O$_3$) in terms of RC and operating temperature. The best MCE material (MnAs$_{1-x}$Sb$_x$) and Gd$_5$(Si$_2$Ge$_2$) can be operated relatively close to room temperature but possesses only about half the RC of the ferroelectric polymers.

TABLE I

Comparison of ECE materials reported here with other
ECE and MCE materials in the literature

| Material | Temperature measured (° C.) | Applied field[1] | ΔS (J/(kgK)) | ΔT (K) | ΔTΔS (J/kg) |
|---|---|---|---|---|---|
| $MnAs_{1-x}Sb_x$[2] | 7 | 5 T | 30 | 13 | 390 |
| $Gd_5(Si_2Ge_2)$[3] | −3 | 10 T | 23.9 | 21 | 502 |
| $PbZr_{0.95}Ti_{0.05}O_3$[4] | 226 | 48 MV/m | 7.9 | 12 | 95 |
| P(VDF-TrFE)[5] | 80 | 209 MV/m | 60.8 | 12.6 | 768 |
| P(VDF-TrFE-CFE)[5] | 45 | 170 MV/m | 53 | 12 | 636 |
| Irradiated P(VDF-TrFE) | 33 | 160 MV/m | 95 | 20 | 1900 |

[1] For MCE, the magnetic field unit is Tesla (T) and for ECE, the unit for electric field is MV/m;
[2] H. Wada and Y. Tanabe, Appl. Phys. Lett. 2001, 79, 3302;
[3] K. A. Gschneidner Jr, V. K. Pecharsky, and A. O. Tsokol, Rep. Prog. Phys. 2005, 68, 1479.
[4] A. S. Mischenko, Q. Zhang, J. F. Scott, R. W. Whatmore, and N. D. Mathur. Science, 311, 1270 (2006);
[5] B. Neese, B. J. Chu, S. G. Lu, Y. Wang, E. Furman and Q. M. Zhang, Science 2008, 321, 821.

The polar polymers described herein can be high energy irradiated fluoropolymers and crosslinked fluoropolymers. These polar polymers can also be crosslinked by other means such as by chemical crosslinking. In one embodiment, dicumyl peroxide can be used for crosslinking the terpolymer using solution cast method. For example, 1.2 g of P(VDF-TrFE-CFE) and 0.06 g of dicumyl peroxide can be dissolved in 22 ml of 1-methyl-2-pyrrolidone (NMP). Then the solution can be casting onto a substrate, e.g., a 4"×6" glass plate, with drying in an oven at about 85 C for about 20 hours. The terpolymer film would be expected to have approximately 10-15% of crosslink.

The results presented indicate the advantages of polar-fluoropolymers in achieving high ECE because of the large entropy change in these polar-polymers.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A cooling device comprising: (i) a polymer which exhibits a temperature change upon application or removal of an electrical field or voltage, wherein the polymer is thermally connected to a cooling load of the cooling device and (ii) a source of voltage that can be applied to the polymer to change the temperature of the polymer, wherein the polymer is a terpolymer represented by the formula P(VDF-TrFE-Rx), wherein R is a co-monomer selected from the group consisting of chlorofluoroethylene, chlorotrifluoroethylene, hexafluoropropylene and mixtures thereof, and wherein x is in a range from 1 mol % to 15 mol %.

2. The device of claim 1, wherein the polymer exhibits an isothermal entropy change in a range from from 25 J/(kgK) to 150 J/(kgK) and an adiabatic temperature change in a range from from 8° C. to 30° C. when an external electric field or voltage is applied or removed from the polymer.

3. A cooling device comprising: (i) a polymer which exhibits a temperature change upon application or removal of an electric field or voltage, wherein the polymer is thermally connected to a cooling load of the cooling device and (ii) a source of voltage that can be applied to the polymer to change the temperature, of the polymer, wherein the polymer is selected from the group consisting of P(VDF-TrFE-CFE), P(VDF-TrFE-CTFE), P(VDF-TrFE-HFP), P(VDF-TrFE-TFE), P(VDF-TrFE-VDC), P(VDF-TrFE-VF), P(VDF-TFE-CFE), P(VDF-TFE-CTFE), P(VDF-TFE-HFP), P(VDF-TFE-VDC), P(VDF-TFE-VF), and mixtures thereof.

4. A cooling device comprising: (i) a polymer which exhibits a temperature change upon application or removal of an electric field or voltage, wherein the polymer is thermally connected to a cooling load of the cooling device and (ii) a source of voltage that can be applied to the polymer to change the temperature of the polymer, wherein the polymer is polyvinylidene fluoride-trifluoroethylene-chlorofluoroethylene having a ratio of monomers represented as $P(VDF_x-TrFE_y-CFE_{1-x-y})$, wherein x has a value of 0.50 to about 0.85, and y has a value of 0.15 to about 0.5.

5. A solid state cooling device comprising: (i) a polymer which exhibits a temperature change upon application or removal of an electrical field or voltage which is thermally connected to a cooling load of the device, (ii) a source of voltage that can be applied to the polymer to change the temperature of the polymer to cool or heat the cooling load of the device, and (iii) a source of an electric field to displace the polymer from the cooling load, wherein the polymer is a terpolymer represented by the formula P(VDF-TrFE-Rx), wherein R is a co-monomer selected from the group consisting of chlorofluoroethvlene, chlorotrifluoroethylene, hexafluoropropylene and mixtures thereof, and wherein x is in a range from 1 mol % to 15 mol %.

6. The solid state cooling device of claim 5, wherein a plate which maintains a thermal gradient and acts as the cooling load is in thermal contact with the polymer and displacement of the polymer from the plate coupled with the temperature change of the polymer by application and removal of the electrical field or voltage produces heat transfer between the polymer and plate, and consequently heat transfer from a cold temperature to a hot temperature, thus creating refrigeration.

* * * * *